United States Patent [19]
Hsu

[11] Patent Number: 5,790,138
[45] Date of Patent: Aug. 4, 1998

[54] METHOD AND STRUCTURE FOR IMPROVING DISPLAY DATA BANDWIDTH IN A UNIFIED MEMORY ARCHITECTURE SYSTEM

[75] Inventor: Fu-Chieh Hsu, Saratoga, Calif.

[73] Assignee: Monolithic System Technology, Inc., Sunnyvale, Calif.

[21] Appl. No.: 587,379

[22] Filed: Jan. 16, 1996

[51] Int. Cl.$^6$ .................................................. G06F 15/167
[52] U.S. Cl. ........................... 345/512; 345/509; 345/519
[58] Field of Search ...................................... 395/501–503, 395/507–509, 512, 511, 519; 345/185, 189, 201, 501–503, 507–509, 512, 511, 519

[56] References Cited

U.S. PATENT DOCUMENTS

| | | | |
|---|---|---|---|
| 5,335,322 | 8/1994 | Mattison | 395/501 |
| 5,450,542 | 9/1995 | Lehman et al. | 395/520 |
| 5,572,655 | 11/1996 | Tuljapurkar et al. | 345/189 |
| 5,608,427 | 3/1997 | Hoffert et al. | 345/201 |

OTHER PUBLICATIONS

Przybylski, Steven, Microprocessor Report, *MoSys Reveals MDRAM Architecture, Radical Alternative Is Not Just Another VRAM*, Dec. 25, 1995, pp. 17–20.

*Primary Examiner*—Kee M. Tung
*Attorney, Agent, or Firm*—Skjerven, Morrill, MacPherson, Franklin & Friel LLP; Norman R. Klivans

[57] ABSTRACT

A computer unified memory architecture (UMA) system and method which includes a unified memory which is partitioned into a main memory and a main frame buffer memory, as well as a separate expansion frame buffer memory. Together, the main frame buffer memory and the expansion frame buffer memory form an entire frame buffer memory. The UMA system performs a display refresh operation by alternately accessing the main frame buffer memory and the expansion frame buffer memory. Because the display data bandwidth is split between the main frame buffer memory and the expansion frame buffer memory, the data bandwidth of the unified memory is effectively increased, thereby enabling higher system performance. The expansion frame buffer memory has a relatively small capacity, thereby retaining much of the cost benefit of a UMA system.

11 Claims, 7 Drawing Sheets

METHOD AND STRUCTURE FOR IMPROVING DISPLAY DATA BANDWIDTH IN A UNIFIED MEMORY ARCHITECTURE SYSTEM

BACKGROUND OF THE INVENTION

1. Field of Invention

The present invention relates to a computer graphics display system that reads pixel data periodically from a frame buffer memory for screen display. More specifically, the present invention relates to a graphics display system which utilizes a unified memory architecture.

2. Description of Related Art

FIG. 1 is a block diagram of a typical display system 100 in a computer system. System 100 includes graphics controller 110, frame buffer memory 111, CRT display 112, and system controller 113. Graphics controller 110 includes multiple processors 101–104 and frame buffer memory interface 105 coupled to a common bus 107. Processors 101–104 include display controller 101, graphics accelerator 102, system interface 103 and video processor 104. Processors 101–104 are each coupled to frame buffer memory 111 through memory interface 105. Frame buffer memory 111 is constructed using a DRAM array and has the capacity to store pixel data for at least one frame of a video display image. Processors 101–104 and memory interface 105 are usually integrated on a single chip.

In general, the performance of display system 100 is limited by the bandwidth of frame buffer memory 111. Display controller 101 consumes most of the data bandwidth of frame buffer memory 111 to refresh the image displayed on CRT display 112. A higher data bandwidth is required when display system 100 is in higher resolution modes with more bits per pixel (for more color variations). For example, if display system 100 displays 1,024×768 pixels at 24 bits (3 bytes) per pixel, frame buffer memory 111 must have a capacity of 2.36 MBytes. To minimize flicker of the display screen, a relatively high screen refresh rate, such as 75 Hz to 100 Hz, is typically used. This means the entire 2.36 MBytes of frame buffer memory 111 is read and drawn on the display 75 to 100 times each second, for an average data bandwidth requirement of 177 to 236 MBytes per second. Excluding the horizontal and vertical retrace times of CRT display 112, the actual data bandwidth required is 250 to 390 MBytes per second. At higher resolution, such as 1,280×1,024 pixels at 24 bits per pixel, the actual data bandwidth requirement is 400 to 600 MBytes per second just for refreshing CRT display 112.

Display system 100 is used in connection with a computer system which also includes a CPU and a main memory (not shown). The CPU accesses frame-buffer memory 111 through system interface 103 and system controller 113 on system bus 114. This is a relatively slow path because data needs to travel through multiple chips and buses and because system (PCI) bus 114 is operated at a lower frequency than common bus 107.

Frame buffer memory 111 typically has a capacity of 1 to 4 MBytes and the main memory typically has a capacity of 4 to 256 MBytes. It is relatively expensive to provide frame buffer memory 111 in addition to the main memory of the computer system. To lower computer system cost, a unified memory architecture (UMA) system, which uses a single memory to implement both the main memory and the frame buffer memory, has been developed.

FIG. 2 is a block diagram of a typical UMA system 200, which includes CPU 201, system controller 202, data path controller 203, unified DRAM array 204, graphics controller 205 and CRT display 210. Buses 211–217 connect the elements of UMA system 200 as illustrated. Unified DRAM array 204 is logically divided into main memory section 204a and frame buffer memory section 204b. System controller 202 and graphics controller 205 share unified DRAM array 204. System controller 202 accesses unified memory 204 by issuing address and control signals on address/control bus 212. Data is then read from (or written to) unified memory 204 by data path controller 203 on internal data bus 214. Data path controller then provides the data to CPU 201 on bus 217.

Graphics controller 205 requests access to unified memory 204 by issuing a first handshake signal (MREQ#) to system controller 202 on bus 213. Graphics controller 205 also issues a second handshake signal (MPR) to indicate the priority of the request. System controller 202 subsequently issues a return handshake signal (MGNT#) to graphics controller 205 on bus 213 to grant this request. Graphics controller 205 then accesses unified memory 204 directly by transmitting conventional address and control signals on address/control bus 212. Data is routed between graphics controller 205 and unified memory 204 on data bus 214.

Thus, in UMA system 200, unified memory 204 must have a data bandwidth sufficient to support accesses by both system controller 202 and graphics controller 205. As long as the display data bandwidth requirement of graphics controller 205 is only a fraction of the total available data bandwidth of the unified memory 204, the performance degradation of UMA system 200 is tolerable. For example, at 1,024×768 pixels and 8 bits per pixel, the required capacity of frame buffer memory 204b is approximately 0.75 MByte. At a display refresh frequency of 100 Hz, the display data bandwidth requirement of frame buffer memory 204b is approximately 80 MBytes per second. If unified memory 204 is 64 bits (8 bytes) wide and operated at 66 MHz, the peak memory bandwidth of unified memory 204 is 528 MBytes per second. Because the display data bandwidth (80 MBytes/sec) is a relatively small fraction of the available data bandwidth of unified memory 204 (528 MBytes/sec), UMA system 200 is adequately supported.

However, at higher display resolution or pixel depths, the display data bandwidth requirement can approach or exceed the available data bandwidth of unified memory 204. In such cases, UMA system 200 delivers very poor performance or fails to support the high resolution display system.

It would therefore be desirable to expand the available data bandwidth of traditional UMA systems using minimum additional circuitry and minimum changes to the traditional UMA protocol, such that high resolution display system s are supported.

SUMMARY OF THE INVENTION

Accordingly, the present invention provides a structure and method for expanding the available data bandwidth in a UMA graphics display system by providing an expansion frame buffer memory which is physically separate from the unified memory. The separate expansion frame buffer memory is accessed using a dedicated bus which is separate from the bus used to access the unified memory. Together, the expansion frame buffer memory and the main frame buffer memory in the unified memory form the entire frame buffer memory.

In one embodiment, the display refresh operation is performed by alternately accessing the main frame buffer memory and the expansion frame buffer memory. Because the required display data bandwidth is split between the main frame buffer memory and the expansion frame buffer memory, the data bandwidth of the unified memory is effectively increased, thereby enabling higher system performance.

In one embodiment, the expansion frame buffer memory has a capacity which is half or less of the total frame buffer memory capacity at the required high-resolution mode. Because the expansion frame buffer memory is only half the size of the total frame buffer memory, much of the cost benefit of the UMA system is retained.

The present invention will be more fully understood in light of the following detailed description taken together with the drawings.

DETAILED DESCRIPTION

Figure 1:
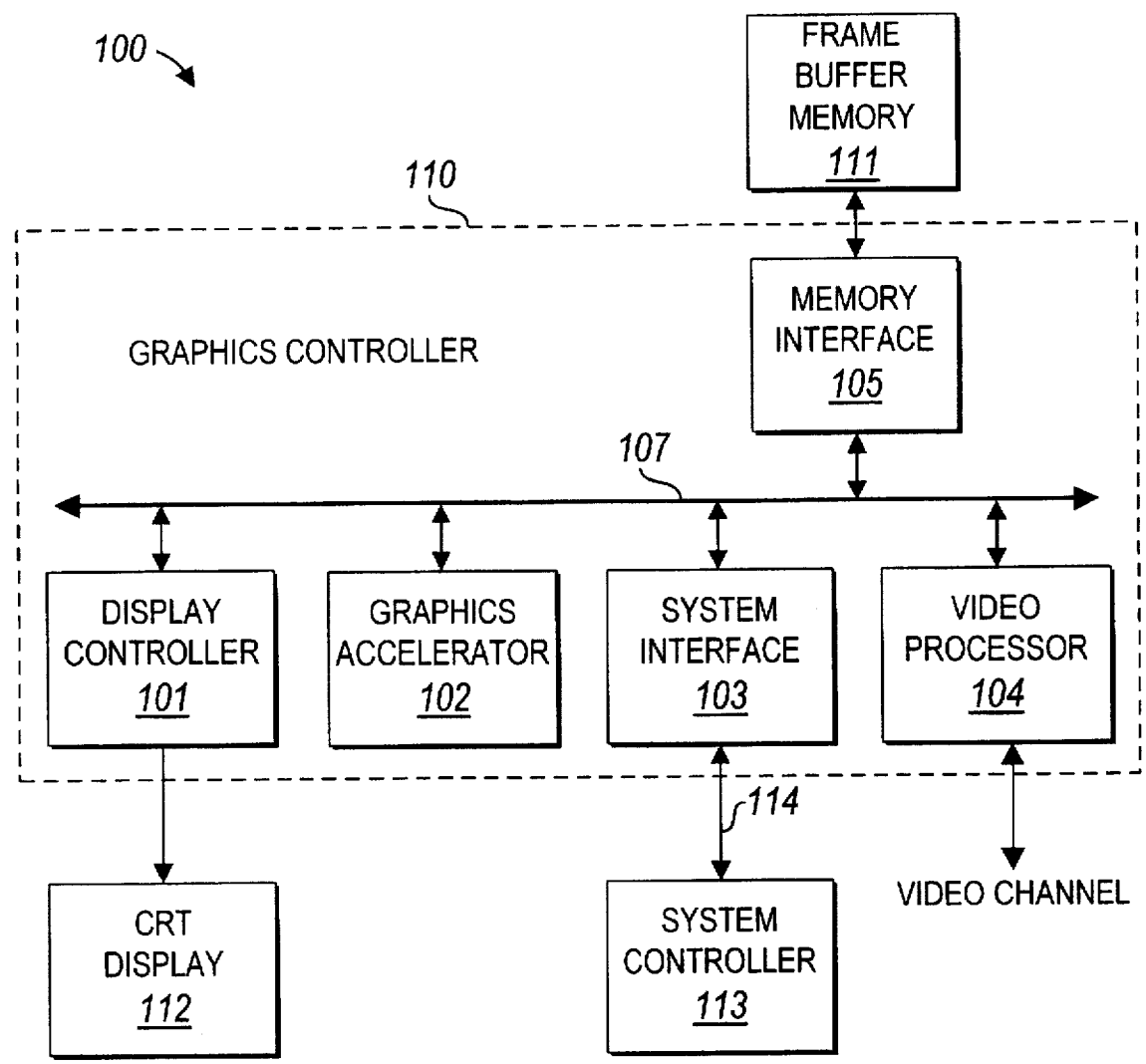
FIG. 1 is a block diagram of a typical display system for a computer system.
Figure 2:
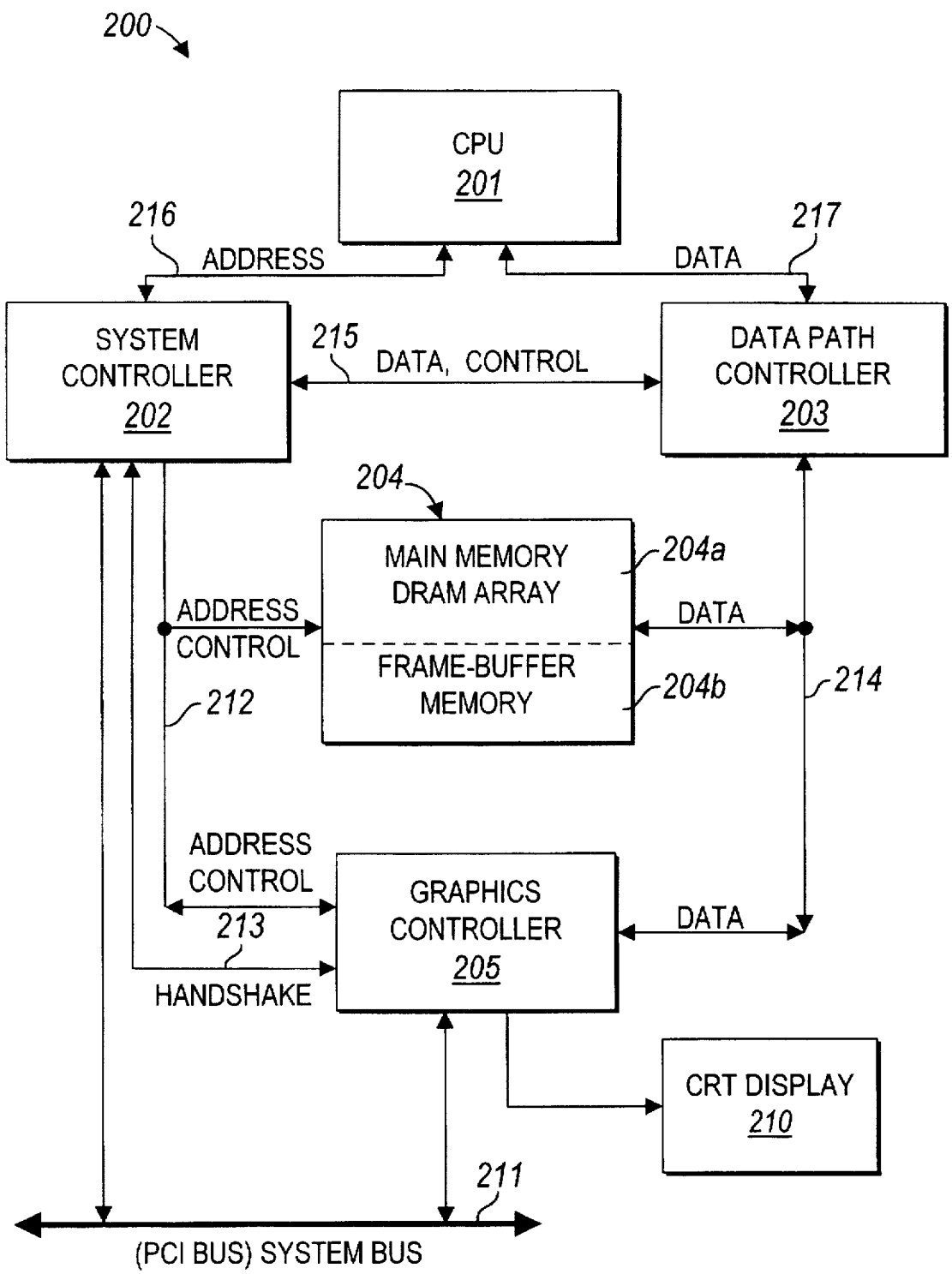
FIG. 2 is a block diagram of a typical UMA system.
Figure 3:
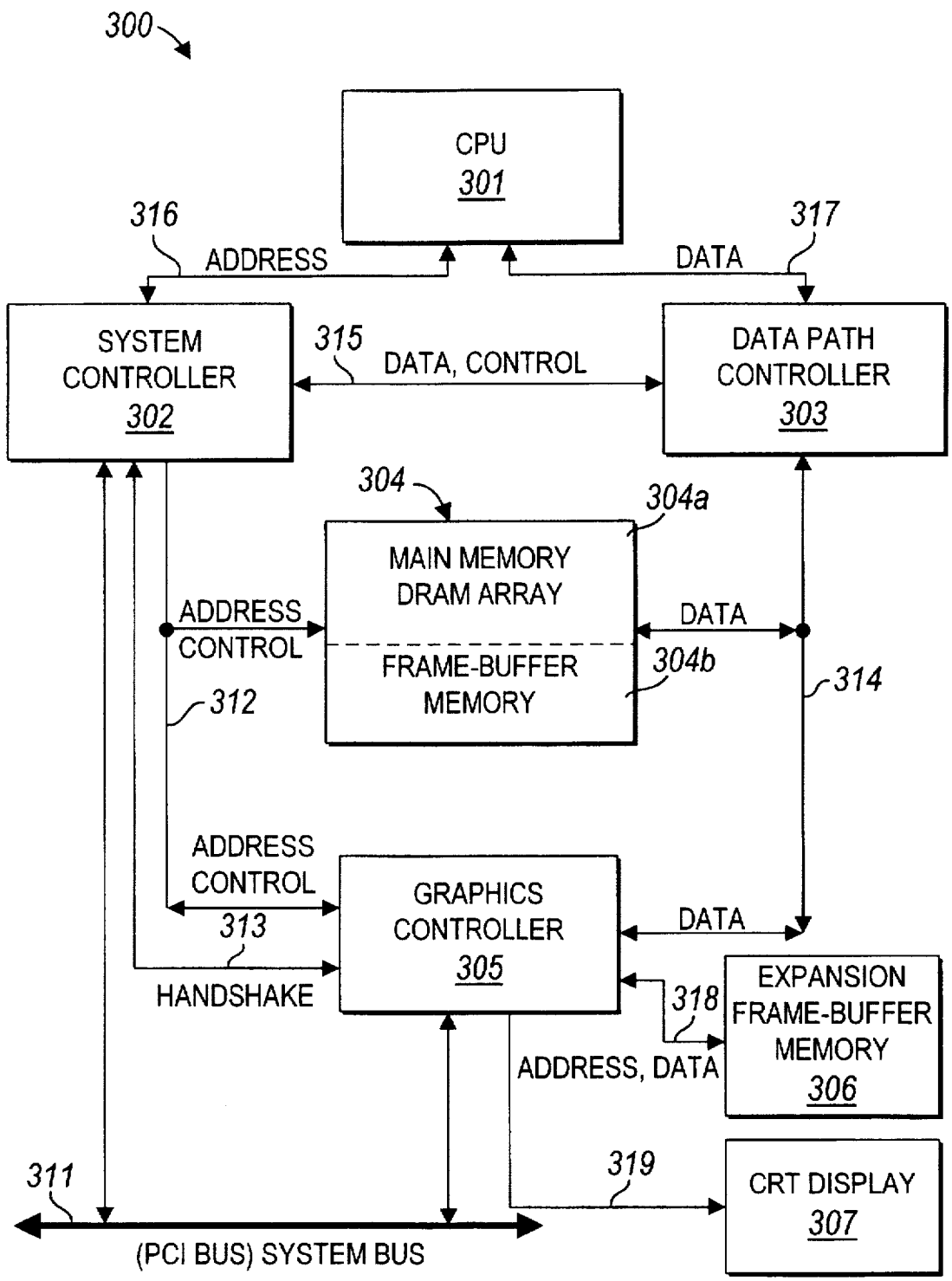
FIG. 3 is a block diagram of a unified memory architecture (UMA) system in accordance with one embodiment of the present invention.

FIG. 3 is a block diagram of a unified memory architecture (UMA) computer system 300 in accordance with one embodiment of the present invention. UMA system includes CPU 301, system controller 302, data path controller 303, unified DRAM memory array 304, graphics controller 305, expansion frame buffer memory 306 and CRT display 307. Buses 311-319 connect the various elements of UMA system 300.

CPU address bus 316 and CPU data bus 317 connect CPU 301 to system controller 302 and data path controller 303, respectively. Data/control bus 315 connects system controller 302 to data path controller 303. Address/control bus 312 connects system controller 302, graphics controller 305 and unified memory 304. Handshake control signal bus 313 connects system controller 302 to graphics controller 305. Unified memory data bus 314 connects unified memory 304, data path controller 303 and graphics controller 305. Address/data bus 318 connects graphics controller 305 to expansion frame buffer memory 306. Display bus 319 connects graphics controller 305 to CRT display 307. Finally, system (PCI) bus 311 connects system controller 302 and graphics controller 305. The signals transmitted on buses 311-319 are discussed in more detail below.

Unified memory 304, which is conventionally implemented using a DRAM array, is logically partitioned into main memory array 304a and main frame buffer memory 304b. Main frame buffer memory 304b forms a first portion of a complete frame buffer memory. Expansion frame buffer memory 306 forms the second portion of the complete frame buffer memory. Frame buffer memory 304b and expansion frame buffer memory 306 are physically separate memories. Frame buffer memory 304b and expansion frame buffer memory 306 are accessed on independent buses and are accessed using separate address/control circuitry within graphics controller 305.

In one embodiment, expansion frame buffer memory 306 has a capacity equal to one half of the total frame buffer capacity required by the high resolution display mode of the computer system. For example, if the high resolution display mode of UMA system 300 requires a 4 MByte frame buffer, expansion frame buffer memory 306 is selected to have a capacity of 2 MBytes and main frame buffer memory 304b is selected to have a capacity of 2 MBytes. In other embodiments, the complete frame buffer memory is allocated between expansion frame buffer memory 306 and main frame buffer memory 304b using other proportions.

The capacity of unified memory 304 is selected such that main memory 304a has the desired capacity in view of the capacity required for main frame buffer memory 304b. For example, unified memory 304 must have a total capacity of 16 Mbytes to provide a main memory 304 having a capacity of 14 Mbytes and a main frame buffer memory 304b having a capacity of 2 Mbytes.

Preferably, expansion frame buffer memory 306 has at least the same data bandwidth as unified memory 304, although this is not required. In one embodiment, unified memory 304 has a data bandwidth of 528 MBytes/sec. In this embodiment, unified memory 304 is an SDRAM (synchronous DRAM) or a burst EDO DRAM having a 64-bit wide data path (8 bytes of 8-bits each) and operating at a frequency of 66 MHz.

In one embodiment, expansion frame buffer memory 306 is the same type of memory as unified memory 304. However, expansion frame buffer memory 306 and unified memory 304 can also be implemented using different types of memory. Because expansion frame buffer memory 306 has a relatively small capacity (i.e., 2 MBytes or less), the loading and parasitics on the expansion memory bus 318 are much less than the loading and parasitics on the unified memory data bus 314. Thus, expansion frame buffer memory 306 can be selected to operate at a higher frequency (i.e. 132 or 264 MHz) than unified memory 304, while having a narrower data bus than unified memory 304. Expansion frame buffer memory 306 can utilize multiplexed address and data signals in the manner of MDRAM (Multibank DRAM). By selecting expansion frame buffer memory 306 in this manner, the pin requirement of expansion frame buffer memory 306 is advantageously minimized. In one embodiment, expansion frame buffer memory 306 is a DRAM array which implements the multibank architecture as described in commonly owned, U.S. patent application Ser. No. 08/270,856, entitled "Directional Asymmetric Swing Bus System for Circuit Module Architecture", by Leung et al., now U.S. Pat. No. 5,655,133 issued Aug. 5, 1997, which is hereby incorporated by reference in its entirety. In a particular embodiment, expansion frame buffer memory 306 has a data bus with a width of 16-bits (2 bytes) and is operated at a frequency of 132 MHz (operated at both edges of the clock signal for a data bandwidth of 528 MBytes/sec). When implemented using the multibank architecture described in U.S. patent application Ser. No. 08/270,856, now U.S. Pat. No. 5,655,133 issued Aug. 5, 1997, expansion frame buffer memory 306 requires only 26 pins to interface with graphics controller 305. Multibank architecture is further described in Przybylski, "MoSys Reveals MDRAM Architecture", Microprocessor Report, Dec. 25, 1995, pp. 17–20, which is hereby incorporated by reference.

Within UMA system 300, the display refresh data bandwidth is divided between unified memory 304 and expansion frame buffer memory 306. In one example, one half of the display refresh data bandwidth is provided by expansion frame buffer memory 306, and the other half of the display refresh data bandwidth is provided by unified memory 304. As a result, a substantial amount of the data bandwidth of unified memory 304 is made available to CPU 301 and other system elements, thereby improving the performance of UMA system 300.

Figure 4:
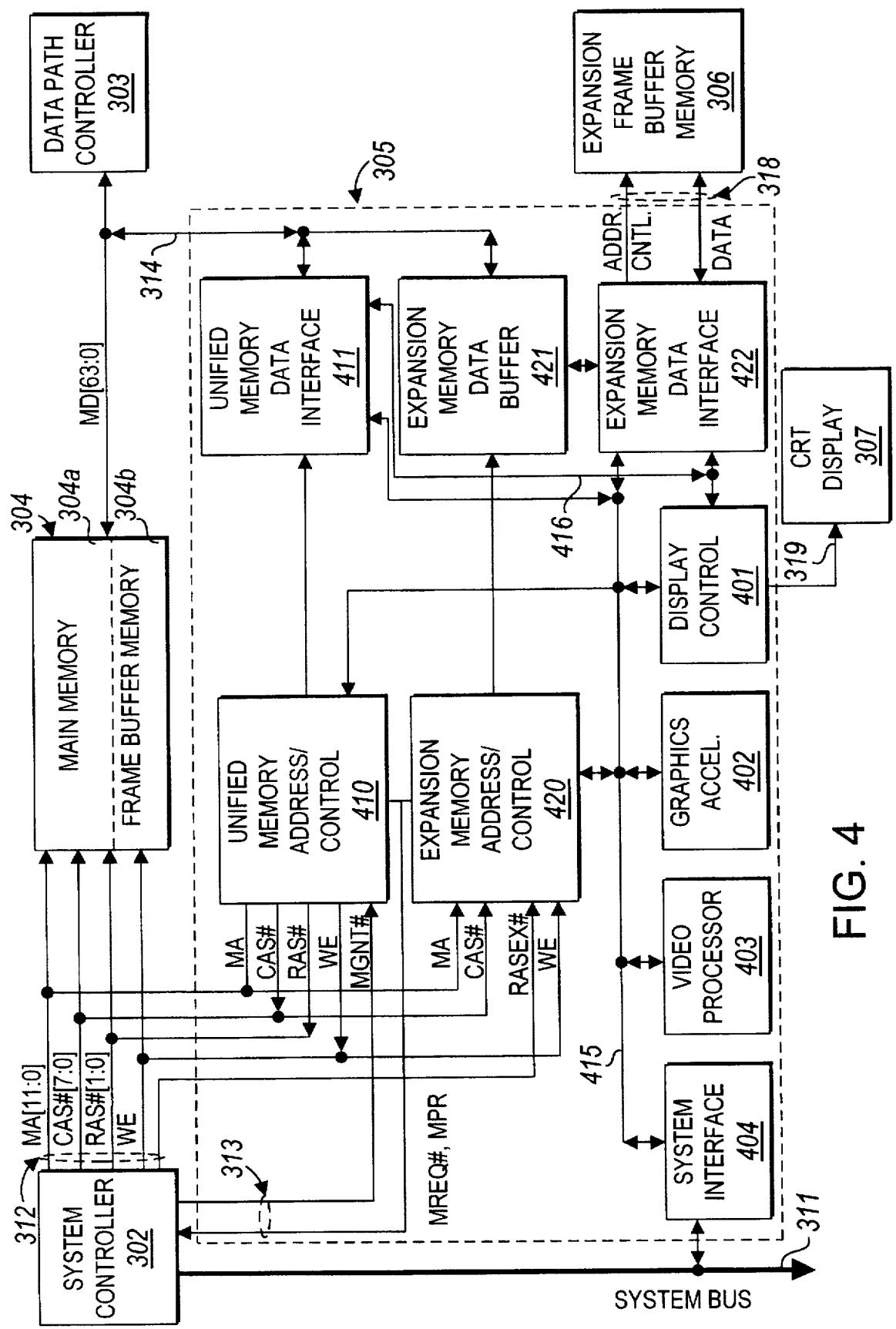
FIG. 4 is a block diagram which illustrates the graphics controller of FIG. 3 in accordance with one embodiment of the invention.

FIG. 4 is a block diagram which illustrates graphics controller 305 in more detail in accordance with one embodiment of the invention. Graphics controller 305 includes display controller 401, graphics accelerator 402, video processor 403, system interface 404, unified memory address/control circuit 410, unified memory data interface 411, expansion memory address/control circuit 420, expansion memory data buffer 421 and expansion memory data interface 422. Processors 401–404, unified memory address/control circuit 410 and unified memory data interface circuit 411 are elements found in conventional UMA systems.

Unified memory data interface 411 and expansion memory data interface 422 are connected to display controller 401 by a dedicated bus 416. Unified memory data interface 411 and expansion memory data interface are also connected to processors 402–404 by another dedicated bus 415. Display controller 401 has control lines which are coupled to bus 415, and optionally has data lines which are connected to bus 415. Buses 415 and 416 provide display controller 401 and processors 402–404 with a maximum data bandwidth equal to the total combined bandwidth of buses 415 and 416. As a result, the total data bandwidth available to display controller 401 and processors 402–404 is increased without requiring a wider internal data bus. A wider internal data bus would consume significantly more silicon area than buses 415 and 416.

Figure 5:
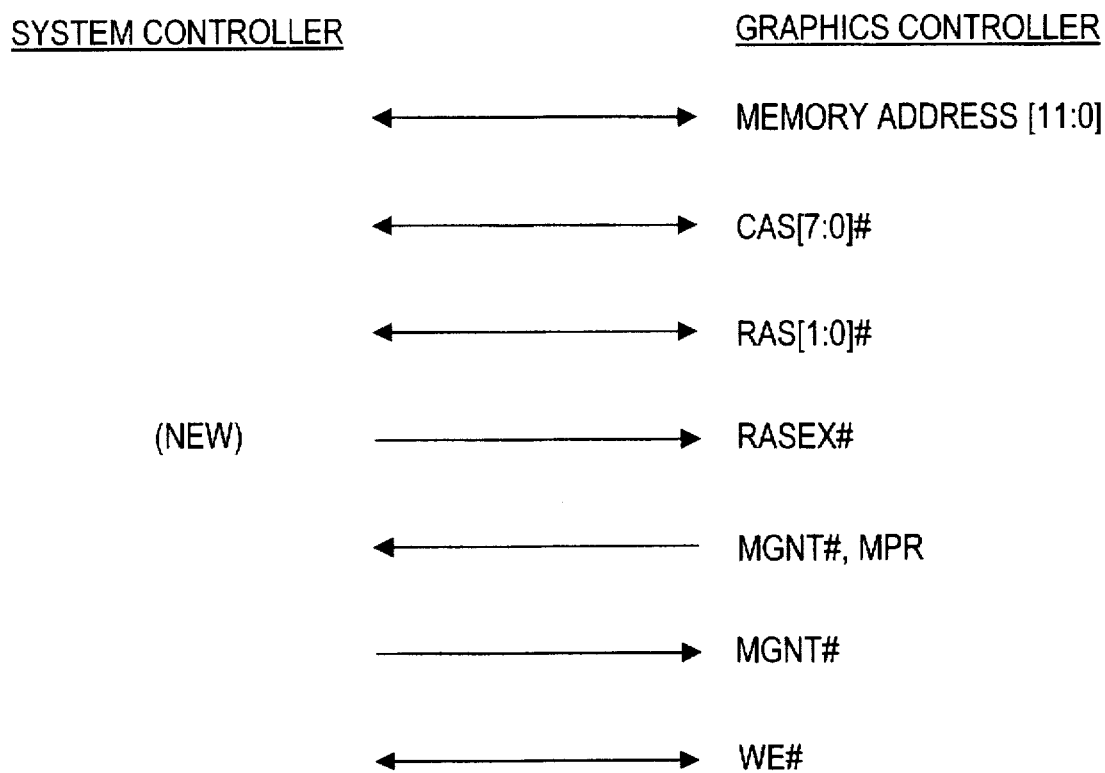
FIG. 5 is a signal chart illustrating the interface signals used in accordance with one embodiment of the invention.

The interface signals used by graphics controller 305, system controller 302 and unified memory 304 are similar to the interface signals used in a conventional UMA system. FIG. 5 illustrates the interface signals in accordance with one embodiment of the invention. These interface signals include: multiplexed row and column address signals MA[11:0] for addressing unified memory 304; column address strobe signals CAS#[7:0] for latching in the column address, advancing the column address (in burst-type DRAM memory), and byte write masking for a single write operation; row address strobe signals RAS#[1:0] for latching in the row address and selecting a memory bank within unified memory 304; and a write enable signal WE# for indicating whether the access is read or write operation. The MA[11:0], CAS#[7:0], RAS#[1:0] and WE# signals are generated by system controller 202 or unified memory address/control circuit 410 and provided to unified memory 304 on bus 312 (FIG. 4).

The interface signals also include a memory request signal MREQ# generated by unified memory address/control circuit 410 to request access to unified memory 304; a memory request 410 priority signal MPR generated by unified memory address/control circuit 410 to indicate whether the memory request has a high or low priority; and a memory grant signal MGNT# generated by system controller 302 to indicate that system controller 302 has granted graphics controller 305 access to unified memory 304.

Each of the previously described interface signals are used in traditional UMA systems. UMA system 300 additionally includes a special row access signal RASEX# which is generated by system controller 302 and provided to expansion memory address/control circuit 420 to enable graphics controller 305 to access expansion frame buffer memory 306.

The previously described interface signals are used to control the following operations within UMA system 300: (1) CPU 301 write to unified memory 304, (2) CPU 301 write to expansion frame buffer memory 306, (3) graphics controller 305 read from unified memory 304, (4) graphics controller 305 read from expansion frame buffer memory 306, (5) CPU 301 read from unified memory 304, and (6) CPU 301 read from expansion frame buffer memory 306. Each of these operations is described in more detail below.

CPU Write to Unified Memory

To perform a write operation to unified memory 304, CPU 301 provides the appropriate address and control signals to system controller 302 on CPU address bus 316, and the appropriate data value (or values) to data path controller 303 on CPU data bus 317. In response, system controller 302 provides multiplexed address signals MA[11:0], column access signals CAS#[7:0], row access signals RAS#[1:0] and write enable signal WE# to unified memory 304 on bus 312. The data value is provided by data path controller 303 to unified memory 304 on data bus 314. As a result, the data value is written to the appropriate address within unified memory 304. During this sequence, system controller 302 does not activate the RASEX# signal. As a result, graphics controller 305 does not access expansion frame buffer memory 306.

CPU write to Expansion Frame Buffer Memory

When CPU 301 is to perform a write access to expansion frame buffer memory 306, CPU 301 instructs system controller 302 to de-activate all row access signals RAS[1:0]# and to activate the RASEX# signal. Because the row access signals RAS#[1:0] are not activated, unified memory 304 is not enabled. The RASEX# signal enables expansion memory address/control circuit 420. In response to instructions received from CPU 301, system controller 302 generates multiplexed address signals MA[11:0], column access signals CAS#[7:0], and a write enable signal WE# which are used to address expansion frame buffer memory 306.

Figure 6:
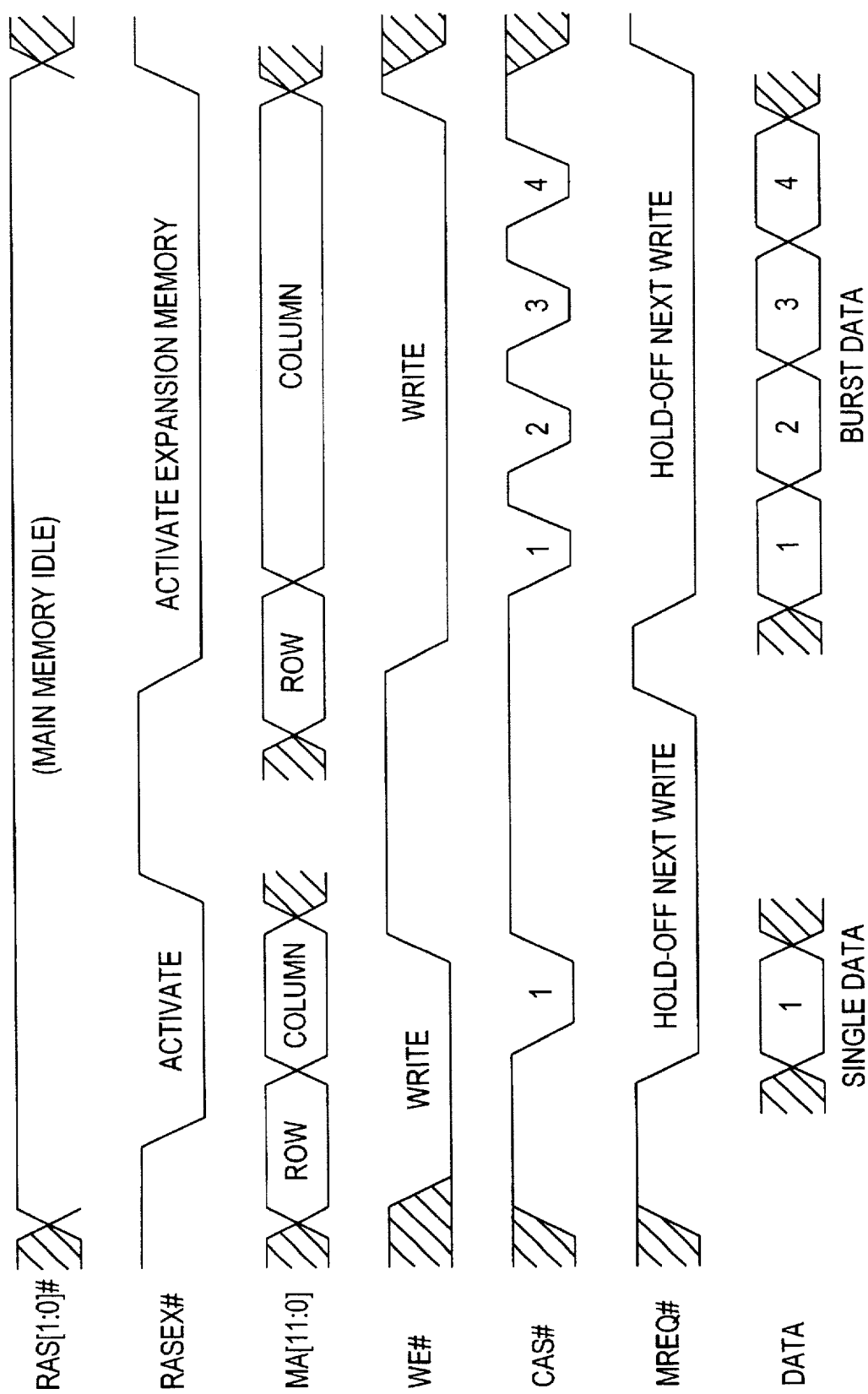
FIG. 6 is a waveform diagram illustrating the interface signals of FIG. 5 during write operations to the expansion frame buffer memory of FIG. 5.

FIG. 6 is a waveform diagram illustrating the interface signals when CPU 301 performs a write operation to expansion frame buffer memory 306. Expansion memory address/control circuit 420 latches in a row address from the multiplexed address signals MA[11:0] at the falling edge of the RASEX# signal. Expansion memory address/control circuit 420 latches in a column address from the multiplexed address signals MA[11:0] at the falling edge of any one of the column access signals CAS#[7:0].

Expansion memory address/control circuit 420 transmits control signals to enable expansion memory data buffer 421. Using a pre-defined timing sequence, the data value to be written is provided by CPU 301, through data path controller 303, to data bus 314. This data value is latched in the expansion memory data buffer 421 at minimum latency and maximum bandwidth when the expansion memory data buffer 421 is enabled. For a data-burst transfer, each successive falling edge of the column access signals CAS#[7:0] will latch a new data value on data bus 314 into expansion memory data buffer 421.

Expansion memory address/control circuit 420 transmits the received row and column address signals to expansion memory data interface 422 on bus 415. In one embodiment, these signals are the same as the signals received by expansion memory address/control circuit 420. In another embodiment, these address signals are modified to allow the use of an expansion frame buffer memory 306 which has a different addressing scheme than unified memory 304. Expansion memory data interface 422 then retrieves the data value (or data values) from expansion memory data buffer 421.

Expansion memory data interface 422 transmits the received address signals and data value(s) to expansion frame buffer memory 306 on bus 318, thereby causing the data value(s) to be written to the appropriate address(es) within expansion frame buffer memory 306.

Data values are temporarily stored in expansion memory data buffer 421 if expansion frame buffer memory 306 is currently busy with another operation (i.e., being accessed for a display refresh operation). Expansion memory data interface circuit 422 does not retrieve the data values stored in expansion memory data buffer 421 until expansion frame buffer memory 306 is available. Expansion memory data interface 422 manages this operation.

CPU 301 must be prevented from performing another write operation to expansion frame buffer memory 306 during the time that data values for a previous write operation are being stored in expansion memory data buffer 421. To accomplish this, expansion memory address/control circuit 420 asserts the memory request signal MREQ# along with a low memory priority signal MPR when CPU 301 is performing a write access to expansion frame buffer memory 306. CPU 301 will not attempt another write operation to expansion frame buffer memory 306 until after the memory request signal MREQ# is de-asserted. The memory request signal MREQ# is not de-asserted until after the data values stored in expansion memory data buffer 421 are successfully written to expansion frame buffer memory 306. Expansion memory data interface 422 manages this operation. As a result, CPU 301 is prevented from overwriting data values stored in expansion memory data buffer 421.

Graphics Controller Read from Unified Memory

Graphics controller 305 performs the display refresh operation by accessing unified memory 304 and expansion frame buffer memory 306. To access unified memory 304, display controller 401 transmits the appropriate address and control signals to unified memory address/control circuit 410. In response, unified memory address/control circuit 410 asserts the memory request signal MREQ# and the memory priority signal MPR, which are provided to system controller 302. The display refresh operation is given a high priority. Consequently, system controller 302 will not perform any additional write operations to unified memory 304 or expansion frame buffer memory 306 until the display refresh request has been granted. System controller 302 asserts the memory access granted signal MGNT# to unified memory address/control circuit 410 to indicate that access to unified memory 304 has been granted.

In response, unified memory address/control circuit 410 transmits multiplexed address signals MA[11:0], column access signals CAS#[7:0], row access signals RAS#[1:0], and write enable signal WE# to unified memory 304 on bus 312. In response, unified memory 304 provides the requested data value(s) on data bus 314. Unified memory address/control circuit 410 then transmits a signal to unified memory data interface 411 on bus 415 to cause the data value(s) to be routed from bus 314, through unified memory data interface 411 to display controller 401. Display controller 401 then transmits the receive data value(s) to CRT display 307 for display.

Graphics Controller Read from Expansion Frame Buffer Memory

To read display data from expansion frame buffer memory 306, display controller 401 transmits the appropriate address and control signals to expansion memory data interface 422. In response, expansion memory data interface 422 provides the appropriate address and control signals to expansion frame buffer memory 306 on bus 415, thereby causing the desired data value(s) to be read from expansion frame buffer memory 306 on bus 318. Expansion memory data interface 422 routes the data value(s) to display controller 401 on bus 416, which in turn provides the data value(s) to CRT display 307 on bus 319. Expansion memory data interface 422 prevents system controller 302 from accessing expansion frame buffer memory 306 at this time.

CPU read from Unified Memory

CPU 301 can read data from unified memory 304 by transmitting the appropriate address signals to system controller 302 on CPU address bus 316. System controller 302 then generates the appropriate signals (i.e., MA[11:0], CAS# [7:0], RAS#[1:0] and WE# (deasserted)) and transmits these signals to unified memory 304. As a result, the requested data value(s) are read from unified memory 304 to data bus 314. Data path controller 303 then routes the data value(s) from bus 314 to CPU 301 on CPU data bus 317.

CPU read from Expansion Frame Buffer Memory

CPU 301 can read data from expansion frame buffer memory 306 in one of two ways. In a first method, CPU 301 transmits the appropriate address and control signals to system controller 302 on CPU address bus 316. System controller 302 transmits these signals to system interface 404 on system bus 311. System interface 404 then transmits the appropriate read signals to expansion data memory interface 422 on bus 415. In response, the appropriate data values are read from expansion frame buffer memory 306 to CPU 301 through expansion memory data interface 422, bus 415, system interface 404, system bus 311, system controller 302, data/control bus 315, data path controller 303 and CPU data bus 317.

A second method for reading data from expansion frame buffer memory 306 by CPU 301 is performed as follows. Expansion frame buffer memory 306 is accessed through system controller 302, expansion memory address/control circuit 420 and expansion memory data interface 422 in a manner which is substantially similar to the manner in which CPU 301 performs a write access to expansion frame buffer memory 306. However, in the present method, the write enable signal WE# is not asserted. As a result, the desired data value is read from expansion frame buffer memory 306 to expansion memory data interface 422. This data value is then transmitted from expansion memory data interface 422 to expansion memory data buffer 421. Expansion memory data buffer 421 provides the data value to data path controller 303 on bus 314. Data path controller 303 then provides the data value to CPU 301 on CPU data bus 317. This method of accessing expansion frame buffer memory 306 does not require the use of system bus 311. As a result, this method of accessing expansion frame buffer memory 306 is faster than the first method described above.

Display Refresh Operation

Figure 7A:
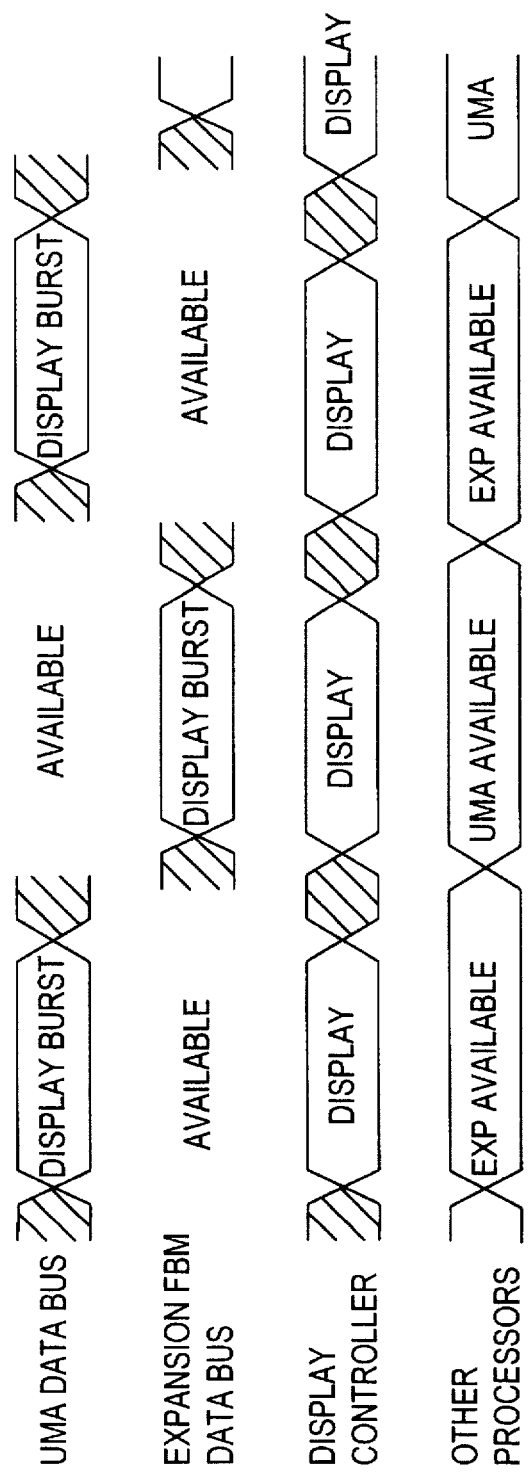
FIG. 7a is a waveform diagram illustrating a method of performing a display refresh operation in accordance with one embodiment of the present invention.

FIG. 7a is a waveform diagram illustrating a method of performing a display refresh operation in accordance with one embodiment of the present invention. When performing a display refresh operation, graphics controller 305 reads data values from both main frame buffer memory 304b and expansion frame buffer memory 306. In the present method, graphics controller 305 alternately accesses frame buffer memory 304b and expansion frame buffer memory 306 such that interleaved display data bursts are provided to display controller 401. As a result, display controller 401 loads data with maximum efficiency while allowing CPU 301 and the other graphics processors 402–404 to access the unified memory 304 and the expansion frame buffer memory 306 with maximum available data bandwidth and minimum circuit overhead.

Figure 7B:
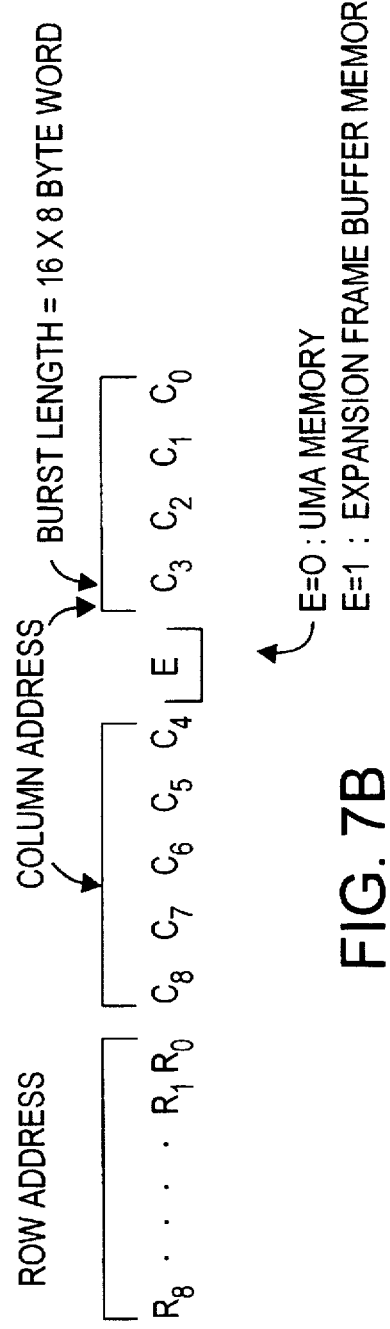
FIG. 7b is a chart illustrating one possible display address mapping scheme which allows the display refresh data to be interleaved.

FIG. 7b illustrates display address mapping which allows the display refresh data to be interleaved. The lower 4 bits C[3:0] of the column address correspond to the data burst size. In the example illustrated, 16 words of 8 bytes each are combined to form a 128 byte burst. An expansion bit, E, is inserted between the upper 4 bits C[8:4] of the column address and the lower 4 bits C[3:0] of the column address. Expansion bit E indicates whether the display data values are retrieved from frame buffer memory 304b (E=0) or from expansion frame buffer memory 306 (E=1). The row address signals R[8:0] are added after the upper four bits C[8:4] of the column address. The R[8:0] and C[8:4] bits may or may not be scrambled to optimize the performance of the graphics system.

If the data bandwidth of expansion frame buffer memory 306 is higher than the data bandwidth of unified memory 304, it is advantageous to configure all or most of the display frame buffer memory (which requires high data bandwidth for the display refresh operation) inside the expansion frame buffer memory 306. All other video memory (required for video windows, offscreen scratch pads or caching areas) are then maintained inside main frame buffer memory 304b within unified memory 304 to enable higher system performance.

The ability for CPU 301 to access the data in expansion frame buffer memory 306 rapidly, and the ability to transport data from unified memory 304 to expansion frame buffer memory 306, enables a high performance graphics display system and a high performance computer system at the same time.

Although the invention has been described in connection with several embodiments, it is understood that this invention is not limited to the embodiments disclosed, but is capable of various modifications which would be apparent to a person skilled in the art. Thus, the invention is limited only by the following claims.

What is claimed is:

1. A unified memory architecture (UMA) system comprising:

an address/control bus;

a data bus;

a unified memory which is logically partitioned into a main memory and a main frame buffer memory;

a system controller coupled to the unified memory by the address/control bus;

a data path controller coupled to the unified memory by the data bus;

a graphics controller coupled to the address/control bus and the data bus, whereby the graphics controller is coupled to the system controller, the data path controller and the main memory;

an expansion bus; and an expansion frame buffer memory coupled to the graphics controller by the expansion bus, wherein the expansion frame buffer memory is physically separate from the unified memory and wherein the main frame buffer memory and the expansion frame buffer memory form a frame buffer memory for the UMA system.

2. The system of claim 1, further comprising a display monitor coupled to the graphics controller, wherein the expansion frame buffer memory stores data used to refresh the display monitor.

3. The system of claim 2, wherein the main frame buffer memory stores data used to refresh the display monitor.

4. The system of claim 3, further comprising a display controller which alternately accesses the frame buffer memory and the expansion frame buffer memory to refresh the display monitor.

5. The system of claim 1, wherein the graphics controller and the expansion frame buffer memory are on the same integrated circuit chip.

6. The system of claim 1, wherein at least two of the graphics controller, the system controller and the data path controller are on the same integrated circuit chip.

7. The system of claim 1, wherein the graphics controller comprises a data buffer coupled to the data bus, wherein the data buffer temporarily stores data received from the data bus.

8. The system of claim 1, wherein the graphics controller comprises:

a display controller;

at least one processor;

a first internal bus coupled to the display controller, the data bus and the expansion frame buffer memory, whereby the first internal bus provides data paths between the display controller and the unified memory and between the display controller and the expansion frame buffer memory; and a second internal bus coupled to the at least one processor, the data bus and the expansion frame buffer memory, whereby the second internal bus provides data paths between the at least one processor and the unified memory and between the at least one processor and the expansion frame buffer memory.

9. The system of claim 1, wherein the address/control bus comprises a line for transmitting a signal from the system controller to the graphics controller to indicate whether the system controller is addressing the unified memory or the expansion memory.

10. The system of claim 1, wherein the address/control bus comprises a line for transmitting a signal from the graphics controller to the system controller to prevent the system controller from accessing the expansion frame buffer memory.

11. A method of refreshing a video display comprising the steps of:

alternately reading data values from a main frame buffer memory and a physically separate expansion frame buffer memory by a graphics controller, thereby creating a stream of interleaved data values;

providing the stream of interleaved data values to a display controller; and transmitting the stream of interleaved data values from the display controller to the video display, thereby refreshing the video display;

wherein the main frame buffer memory is part of a unified memory which is logically partitioned into a main memory and the main frame buffer memory and the expansion frame buffer memory is coupled to the graphics controller by an expansion bus.

* * * * *